United States Patent
Harris et al.

(10) Patent No.: US 10,058,085 B2
(45) Date of Patent: Aug. 28, 2018

(54) TRUCK BED FISHING ROD CARRIER SYSTEM

(71) Applicant: Toyota Motor Engineering & Manufacturing North America, Inc., Erlanger, KY (US)

(72) Inventors: Ryan C. Harris, Saline, MI (US); Scott L. Frederick, Brighton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 15/262,411

(22) Filed: Sep. 12, 2016

(65) Prior Publication Data

US 2018/0070573 A1 Mar. 15, 2018

(51) Int. Cl.
*A47B 81/00* (2006.01)
*A01K 97/10* (2006.01)
*B60R 9/08* (2006.01)

(52) U.S. Cl.
CPC ............ *A01K 97/10* (2013.01); *B60R 9/08* (2013.01)

(58) Field of Classification Search
CPC ...... A47B 81/005; A01K 97/10; A01K 97/08; B60R 9/08
See application file for complete search history.

(56) References Cited

U.S. PATENT DOCUMENTS

| 2,536,797 | A | * | 1/1951 | Cooke | B60R 9/08 211/70.8 |
|---|---|---|---|---|---|
| 4,063,704 | A | | 12/1977 | Rother | |
| 5,184,797 | A | | 2/1993 | Hurner | |
| 5,446,989 | A | * | 9/1995 | Stange | A01K 97/10 43/21.2 |
| 6,003,748 | A | | 12/1999 | Rivenbark | |
| 6,739,084 | B1 | | 5/2004 | Hansen et al. | |
| 8,746,469 | B1 | | 6/2014 | De La Torre | |
| 8,875,963 | B2 | * | 11/2014 | Knutson | A01K 97/08 224/405 |
| 9,161,523 | B2 | | 10/2015 | Conry | |

* cited by examiner

*Primary Examiner* — Amy J. Sterling
(74) *Attorney, Agent, or Firm* — Christopher G. Darrow; Darrow Mustafa PC

(57) ABSTRACT

Described herein is a fishing rod carrier. The fishing rod carrier may comprise a front holder portion. The front holder portion may comprise a foam body surrounding an opening for receiving a tip end of a fishing rod and a first connector assembly proximate to the foam body. The fishing rod carrier may comprise a rear holder portion. The rear holder portion may comprise a semi-cylindrical body for receiving a handle end of the fishing rod and a second connector assembly proximate to the semi-cylindrical body. The fishing rod carrier may comprise a first rail configured to receive one or more of the first connector and the second connector.

12 Claims, 7 Drawing Sheets

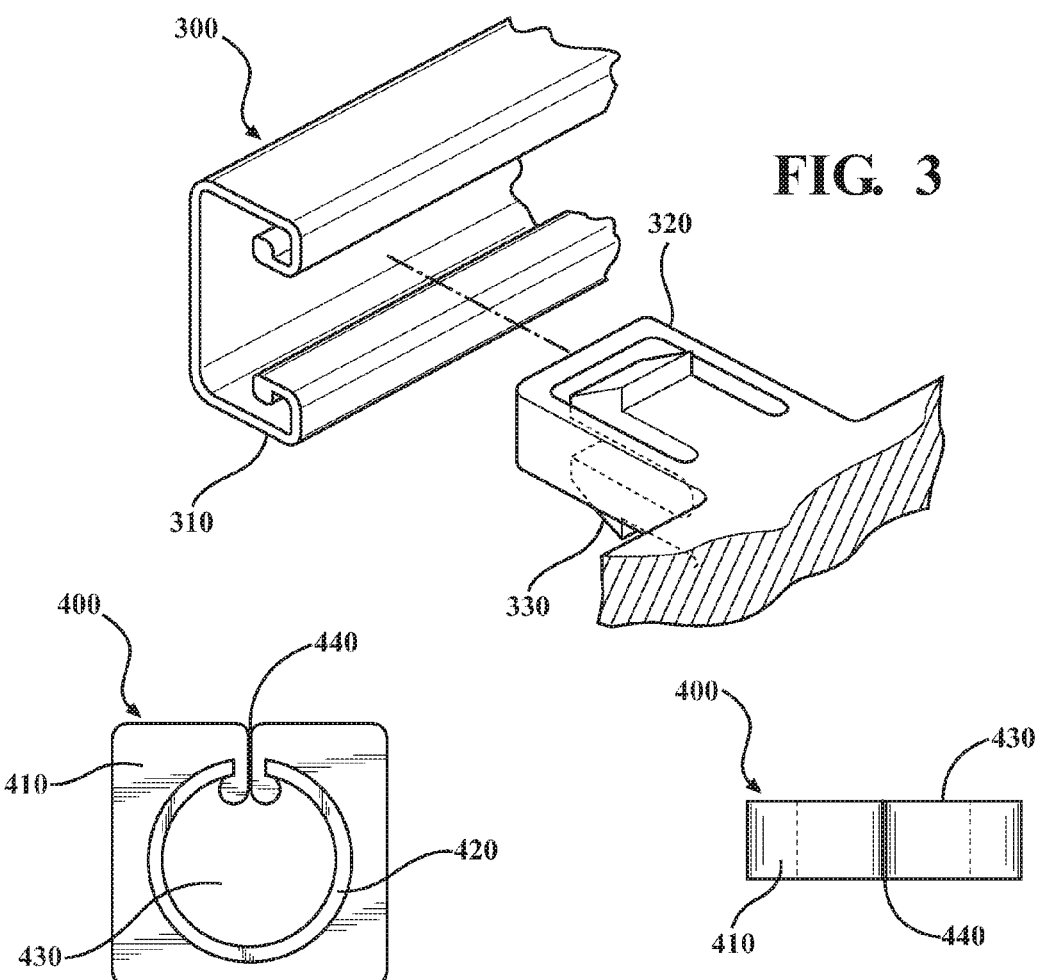
FIG. 3
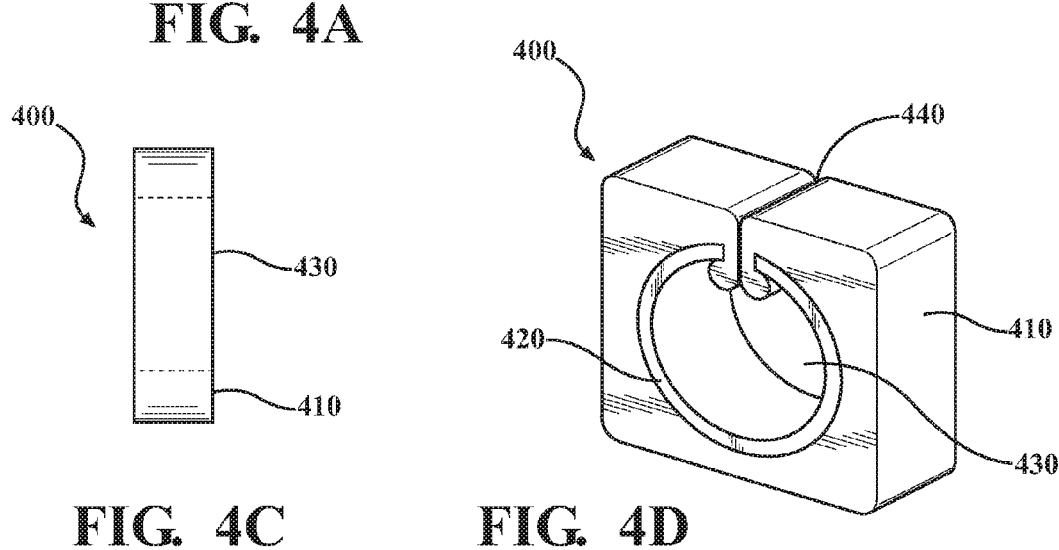
FIG. 4A
FIG. 4B
FIG. 4C
FIG. 4D

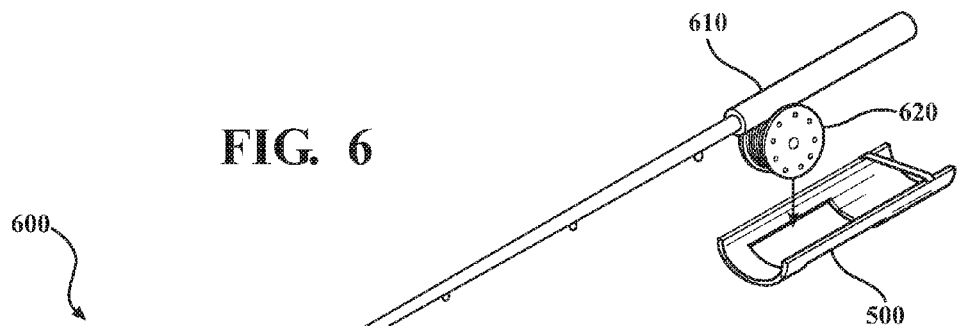
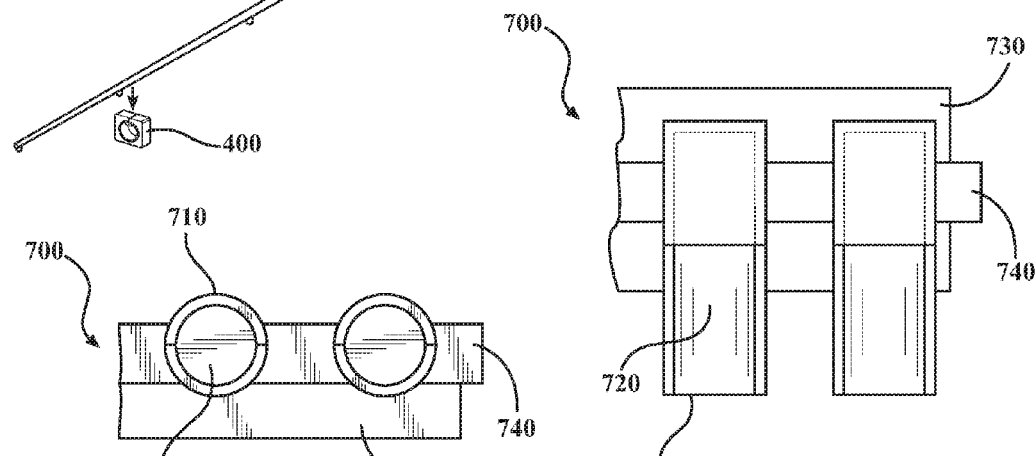
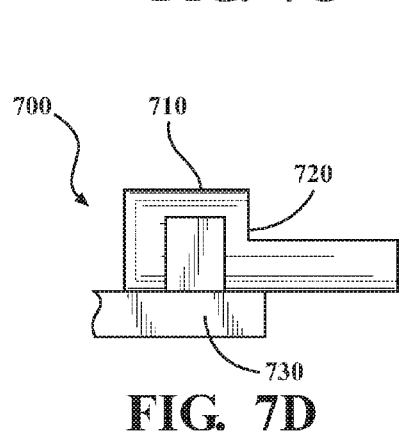
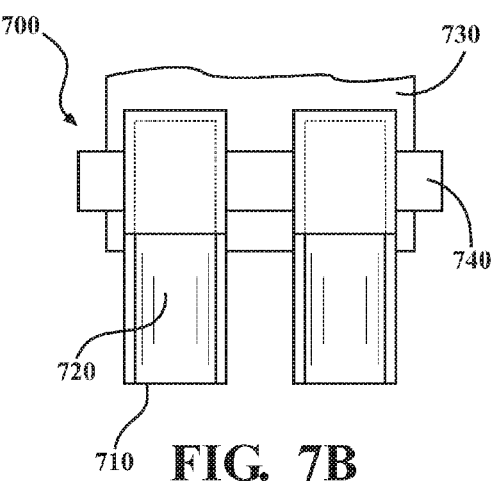

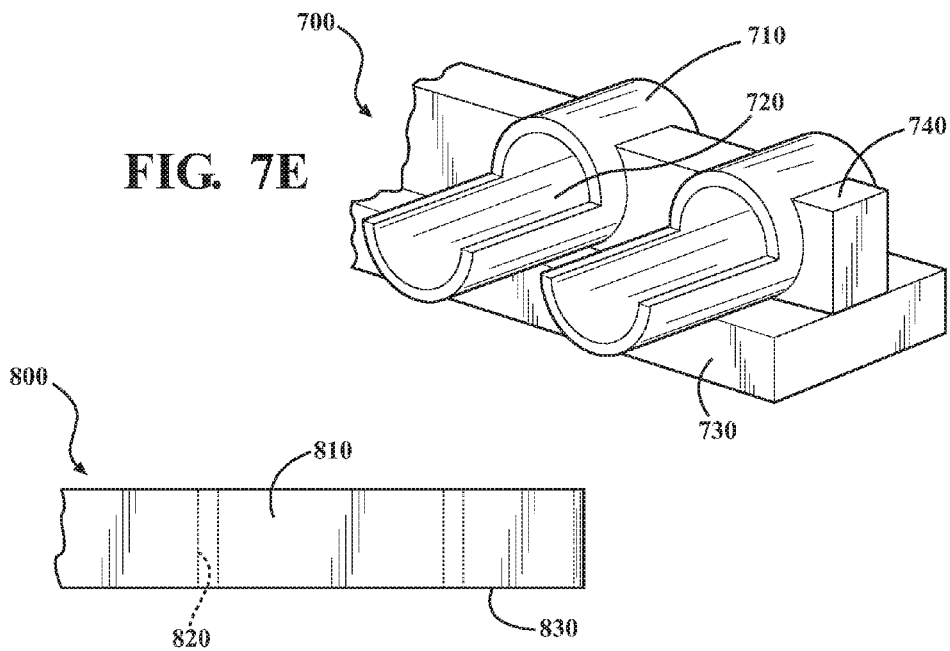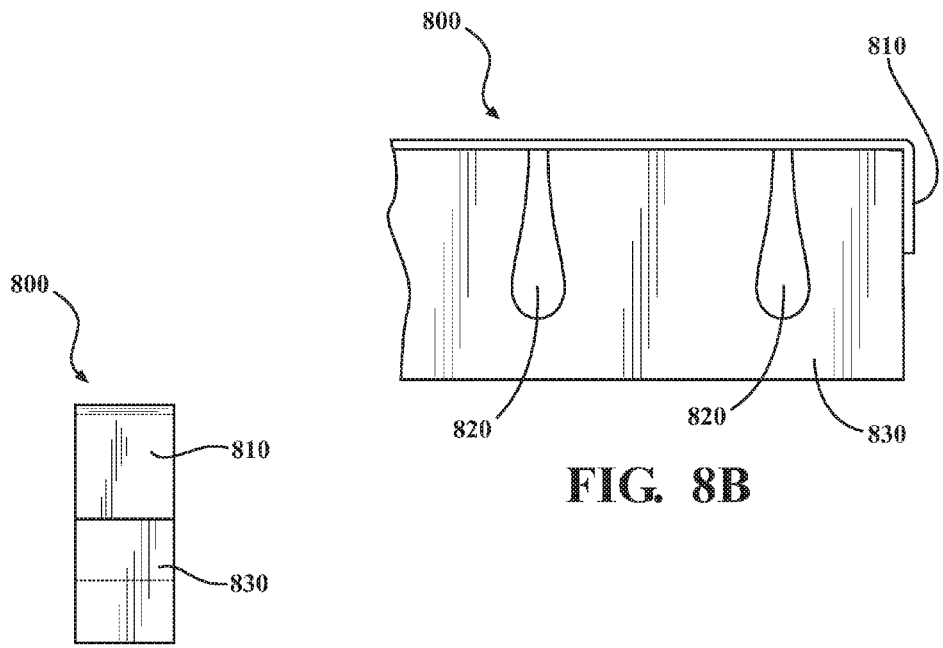

TRUCK BED FISHING ROD CARRIER SYSTEM

TECHNICAL FIELD

The subject matter described herein relates in general to fishing rod carriers and, more particularly, to a truck bed fishing rod carrier system.

BACKGROUND

Some fishermen use pickup trucks when visiting a fishing location. If a fishing location is not producing, the fisherman may pack up gear and head to another fishing location. The fisherman may place his fishing rods in the bed of his truck where they may tumble around and become damaged. Sometimes, fishing rods need to have their reels or lines serviced while a fisherman is at a fishing location.

SUMMARY

Described herein are embodiments of a fishing rod carrier system. The fishing rod carrier system may be mounted in the bed of a truck, e.g., a pickup truck.

In an embodiment described herein a fishing rod carrier may comprise a front holder portion. The front holder portion may comprise a foam body surrounding an opening for receiving a tip end of a fishing rod and a first connector assembly proximate to the foam body. The fishing rod carrier may comprise a rear holder portion. The rear holder portion may comprise a semi-cylindrical body for receiving a handle end of the fishing rod and a second connector assembly proximate to the semi-cylindrical body. The fishing rod carrier may comprise a first rail configured to receive one or more of the first connector and the second connector.

In another embodiment described herein a fishing rod carrier may comprise a front holder portion. The front holder portion may comprise a foam body surrounding an opening for receiving a tip end of a fishing rod and a first connector assembly proximate to the foam body. The fishing rod carrier may comprise a rear holder portion. The rear holder portion may comprise a semi-cylindrical body for receiving a handle end of the fishing rod and a second connector assembly proximate to the semi-cylindrical body. The fishing rod carrier may comprise a side rail configured to receive one or more of the first connector and the second connector, the side rail coupled to a side wall of a pickup truck bed. The fishing rod carrier may comprise a rear rail configured to receive one or more of the first connector and the second connector, the rear rail coupled to a rear wall of the pickup truck bed.

In another embodiment described herein a fishing rod carrier may comprise a front holder portion. The front holder portion may comprise means for receiving a tip end of a fishing rod and means for coupling the front holder portion to one or more rails. The fishing rod carrier may comprise a rear holder portion. The rear holder portion may comprise means for receiving a handle end of the fishing rod and means for coupling the rear holder portion to one of the one or more rails.

BRIEF DESCRIPTION OF THE DRAWINGS

FIG. 3 is a diagram of an embodiment of a rail and connector system.

FIG. 4A is a front view of an embodiment of a front holder portion.

FIG. 4B is a top view of an embodiment of a front holder portion.

FIG. 4C is a side view of an embodiment of a front holder portion.

FIG. 4D is an isometric view of an embodiment of a front holder portion.

FIG. 6 is a diagram of an embodiment of a fishing rod and fishing rod carrier system.

FIG. 7A is a top view of an embodiment of a rear holder portion.

FIG. 7B is a top view of an embodiment of a rear holder portion rotated ninety degrees.

FIG. 7C is a front view of an embodiment of a rear holder portion.

FIG. 7D is a side view of an embodiment of a rear holder portion.

FIG. 7E is an isometric view of an embodiment of a rear holder portion.

FIG. 8A is a top view of an embodiment of a front holder portion.

FIG. 8B is a front view of an embodiment of a front holder portion.

FIG. 8C is a side view of an embodiment of a front holder portion.

DETAILED DESCRIPTION

Described herein are embodiments of a fishing rod carrier system. The fishing rod carrier system may be mounted in the bed of a truck, e.g., a pickup truck. Mounting the fishing rod carrier system in the bed of a truck provides easy access to the fishing rods stored therein. In an embodiment, a fisherman may sit on the tailgate of the truck and service the fishing rods. The fishing rod carrier system may provide a stable work area to service the fishing rods. The fishing rod carrier system may also provide a stable storage location while a fisherman travels from one fishing location to another.

The fishing rod carrier system may comprise of a front holder portion and a rear holder portion. The front and rear holder portions may have a connector system that allows them to be connected to one or more rails mounted in the bed of a truck. The connector system may be a clip, clamp, screw, or apparatus for connecting the front and rear holder portions to a rail. In an embodiment, the front and rear holder portions may both be coupled to a side rail in the truck bed. In another embodiment, the front holder portion may be coupled to a side rail and the rear holder portion may be connected to a rear rail in the truck bed.

The front holder portion may be shaped to hold the tip of a fishing rod. In an embodiment, the front holder has a foam or other material that may be compressed and return back to substantially original shape. In an embodiment, the foam or other material may surround a rigid ring. The rigid ring may have an opening to allow the tip of the fishing rod to be inserted into the ring. The size of the rigid ring may be selected to be slight larger than the diameter of the tip of the fishing rod. The extra space may be utilized for servicing the line on the fishing rod. The front holder portion may also comprise a strap to hold the rod tip in place. The strap may be any flexible material, e.g. a bungee cord.

The rear holder portion may be shaped to hold the handle of a fishing rod. In an embodiment, the rear holder portion may have a semi-cylindrical shaped body. The rear holder portion may comprise an opening. A reel of a fishing rod may fit through the opening when the fishing rod handle is resting in the rear holder portion. In another embodiment, the body of the rear holder portion may have a semi-cylindrical portion and a cylindrical portion. In this embodiment, the end of the handle of the fishing rod may slide into the cylindrical portion of the rear holder portion while also resting on the semi-cylindrical portion. The rear holder portion may comprise a base. The body may be couple to the base to allow for the orientation of the body to be rotated. The body may be rotated based upon whether the rear holder portion is connected to a side rail or a rear rail. The rear holder portion may also comprise a strap to hold the rod tip in place. The strap may be any flexible material, e.g. a bungee cord.

Figure 1:
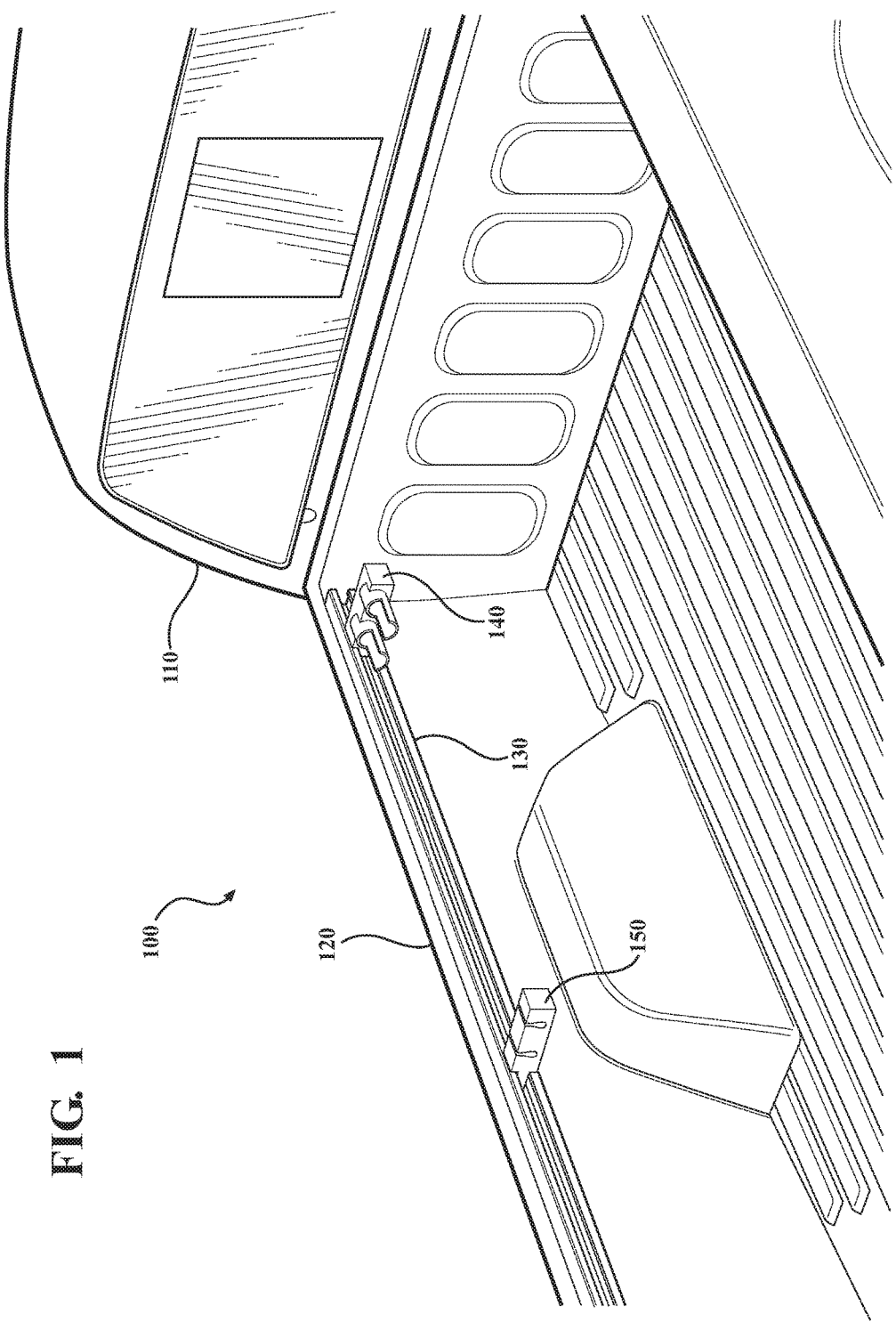
FIG. 1 is a diagram of an embodiment of a truck bed fishing rod carrier system with a single rail.

FIG. 1 is a diagram of an embodiment of a truck bed fishing rod carrier system 100 with a single rail. The system 100 may comprise a rail 130 mounted in a bed 120 of a pickup truck 110. The system 100 may also comprise a front holder portion 150 and a rear holder portion 140. Front holder portion 150 and rear holder portion 140 may be mounted on rail 130 to allow movement of front holder portion 150 and rear holder portion 140 along rail 130. The position of front holder portion 150 and rear holder portion 140 may be adjusted based on a number of factors including, but not limited to, the length of the poles and the length of the truck bed.

Figure 2:
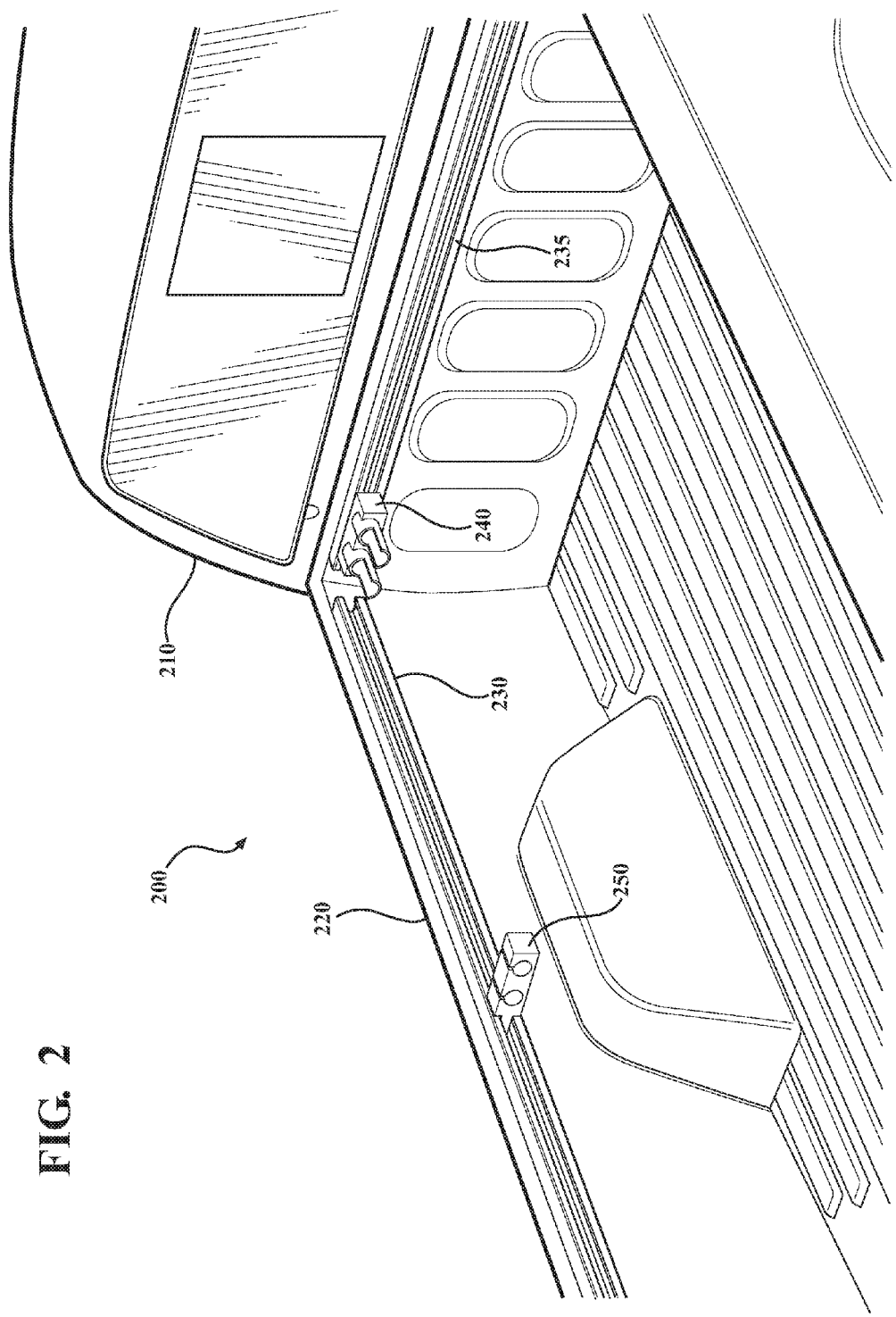
FIG. 2 is a diagram of an embodiment of a truck bed fishing rod carrier system with two rails.
Figure 5A:
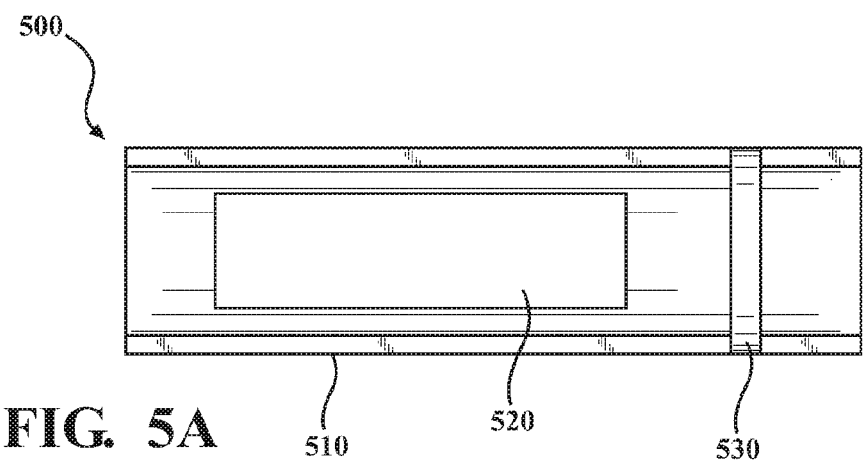
FIG. 5A is a top view of an embodiment of a rear holder portion.
Figure 5B:
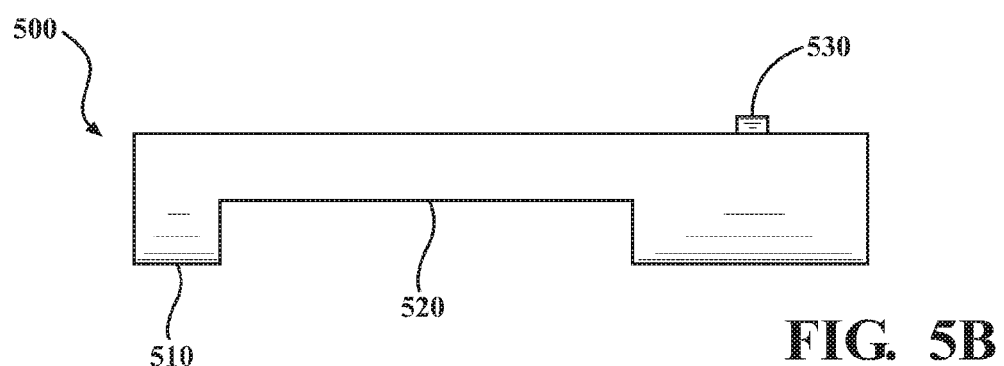
FIG. 5B is a side view of an embodiment of a rear holder portion.
Figure 5C:
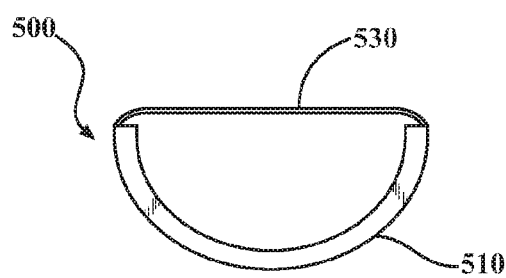
FIG. 5C is a front view of an embodiment of a rear holder portion.
Figure 5D:
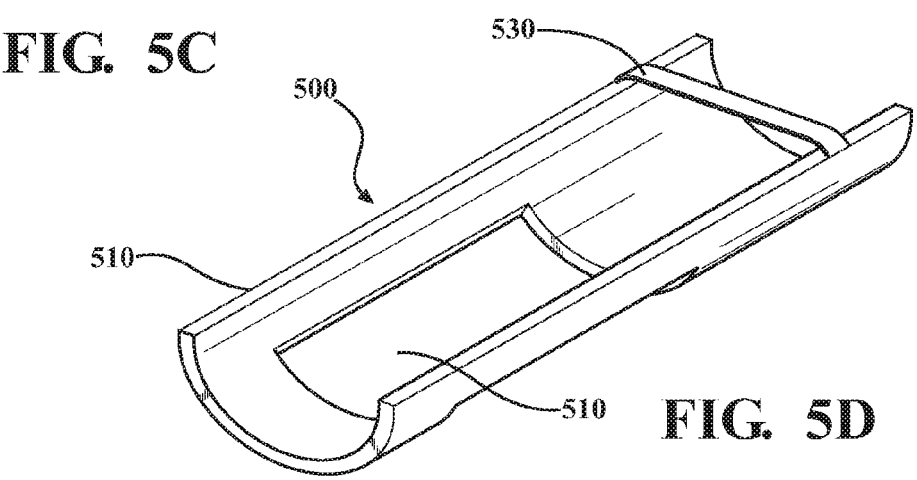
FIG. 5D is an isometric view of an embodiment of a rear holder portion.
Figure 8D:
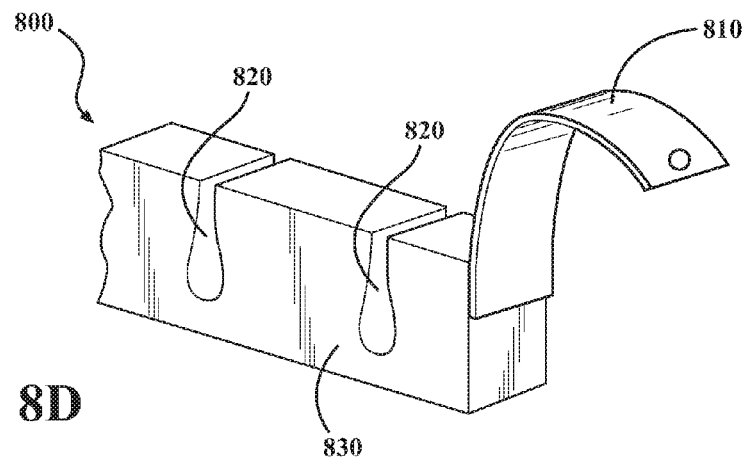
FIG. 8D is an isometric view of an embodiment of a front holder portion.

FIG. 2 is a diagram of an embodiment of a truck bed fishing rod carrier system 200 with dual rails. The system 200 may comprise a side rail 230 and a rear rail 235 mounted in a bed 220 of a pickup truck 210. The system 200 may also comprise a front holder portion 250 and a rear holder portion 240. Front holder portion 250 may be mounted on side rail 230 to allow movement of front holder portion 250 along side rail 230. Rear holder portion 240 may be mounted on rear rail 235 to allow movement of rear holder portion 240 along rear rail 235. The position of front holder portion 150 and rear holder portion 140 may be adjusted based on a number of factors including, but not limited to, the length of the poles and the length of the truck bed.

FIG. 3 is a diagram of an embodiment of a rail and connector system 300. System 300 comprises a rail 310 and a connector assembly 320. Connector assembly 320 may comprise a latch 330. Latch 330 may be a push button connector that couples the connector assembly 320 to rail 310. Depressing latch 330 may allow removing or reposition the connector assembly 320. Latch 330 may be spring loaded or comprise some other mechanism that facilitates repositioning the connector assembly 320 rail 310. Rail 310 and connector assembly 320 may be made primarily of plastic or metal, or some other material suitable for installation in a truck bed.

FIGS. 4A-4D are multiple views of an embodiment of a front holder portion 400. Front holder portion 400 may comprise an outer portion 410. Outer portion 410 may be constructed of a foam or gel type material that may be compressed to allow a fishing rod to pass through opening 440. The foam or gel type material may return to its original shape after the fishing rod has passed though opening 440. Front holder portion 400 may comprise an inner portion 420. Inner portion 420 may be constructed of a rigid material, for example polyvinyl chloride (PVC). Inner portion 420 may be a partial ring with an opening for a fishing rod to pass through. Inner portion 420 may be a diameter greater than that of a fishing rod to allow the fishing rod to be moved as needed to adjust a line or make other adjustments to the rod.

FIGS. 5A-5D are multiple views of an embodiment of a rear holder portion 500. Rear holder portion 500 comprise a body 510. Body 510 may be a semi-cylinder. The semi-cylinder may be of a diameter greater than a fishing rod handle. A fishing rod handle may be placed in the body 510. Body 510 may surround an opening 520. A reel attached to a rod may be placed through opening 520. In this position, the reel may be adjusted or replaced while the rod rests in the body 510. A strap 530 may be placed over a rod resting in the body 510 to hold the rod in place. Strap 530 may be any flexible material that may hold a rod in place, for example a bungee cord.

FIG. 6 is a diagram of an embodiment of a fishing rod and fishing rod carrier system 600. Fishing rod 610 may be stored using front holder portion 400 and rear holder portion 500. Reel 620 may be positioned through the opening in rear holder portion 500. The tip of the rod may be stored in front holder portion 400. Rod 610 and reel 620 may be serviced while the rod is stored in the rod holder system. The front holder portion 400 and rear holder portion 500 may each comprise a connector system 300 (not pictured). The connector system 300 may facilitate connection of the front holder portion 400 and rear holder portion 500 to a rail, for example rail 310.

FIGS. 7A-7E are multiple views of an embodiment of a rear holder portion 700. Rear holder portion 700 may comprise a body portion 710. Rear holder portion 700 is shown with two body portions 710. In some embodiments, more than two or less than two body portions 710 may be present. Body portion 710 may be semi-cylindrical in shape. A portion of the cylinder may be removed to surround an opening 720 to allow a fishing rod handle to be set in the body portion 710. Body portion 710 may be attached to connecting portion 740. Connecting portion 750 may surround all or a portion of body portion 710. Connecting portion 740 may be attached to base 730.

Connecting portion 750 may be attached to base 730 such that connecting portion 740 may be rotated on base 730. If rail 310 is mounted at the back of a pickup truck bed, connecting portion 750 may be rotated 90 degrees (shown in FIG. 7B) relative to the position that connection portion would be in if rail 310 is mounted to the side of a pickup truck bed (shown in FIG. 7A). Rear holder portion 700 may comprise a connector system 300 (not pictured). The connector system 300 may facilitate connection of the rear holder portion 700 to a rail, for example rail 310.

FIGS. 8A-8D are multiple views of an embodiment of a front holder portion 800. Front holder portion 800 may comprise a body 830. Body 830 may be constructed of a foam or gel type material that may be compressed to allow a fishing rod to pass through an opening into area 820. The foam or gel type material may return to its original shape after the fishing rod has been inserted into area 820. Area 820 may be a diameter slightly greater than that of a fishing rod to allow the fishing rod to be held in place during transport or maintenance of the rod and/or reel. Front holder portion 800 may further comprise a strap 810. Strap 810 may be used to hold a fishing rod in place. Strap 810 may be constructed using any flexible material, e.g. bungee material, such that strap 810 may be moved in order to insert or remove a fishing rod from front holder portion 800.

Figure 9:
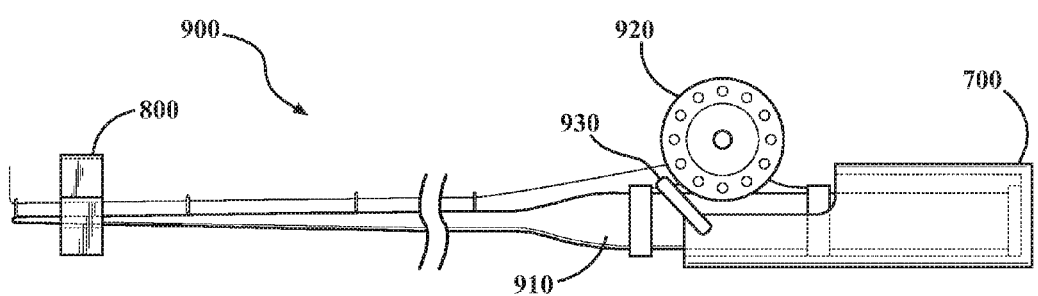
FIG. 9 is a diagram of an embodiment of a fishing rod and fishing rod carrier system.

FIG. 9 is a diagram of an embodiment of a fishing rod and fishing rod carrier system 900. Fishing rod 910 may be stored using front holder portion 800 and rear holder portion 700. Fishing rod 910 may be positioned in a cylindrical portion of rear holder portion 700. The tip of the rod may be stored in front holder portion 800. Fishing rod 910 and reel 920 may be serviced while the fishing rod 910 is stored in the fishing rod carrier system 900. Fishing rod 910 may be held in place by a strap 930. Strap 930 may be constructed using any flexible material, e.g. bungee material, such that strap 930 may be moved in order to insert or remove fishing rod 910 from rear holder portion 700. The front holder portion 800 and rear holder portion 700 may each comprise a connector system 300 (not pictured). The connector system 300 may facilitate connection of the front holder portion 400 and rear holder portion 500 to one or more rails, for example rail 310.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details.

What is claimed is:

1. A fishing rod carrier comprising:
   a front holder portion comprising:
      a foam body surrounding an opening for receiving a tip end of a fishing rod; and
      a first connector proximate to the foam body;
   a rear holder portion comprising:
      a semi-cylindrical body for receiving a handle end of the fishing rod; and
      a second connector proximate to the semi-cylindrical body; and
   a first rail configured to receive one or more of the first connector and the second connector, the first rail being located within a pickup truck bed,
   the front holder portion and the rear holder portion being located within the pickup truck bed below an uppermost surface of the pickup truck bed in the vertical direction, whereby a fishing rod carried by the front holder portion and the rear holder portion is located within the pickup truck bed below the uppermost surface of the pickup truck bed in the vertical direction.

2. The fishing rod carrier of claim 1, wherein the first rail is coupled to a side wall of a pickup truck bed.

3. The fishing rod carrier of claim 2 further comprising a second rail configured to receive one or more of the first connector and the second connector, the second rail coupled to a rear wall of the pickup truck bed.

4. The fishing rod carrier of claim 3, wherein the rear holder portion further comprises a base, the second connector coupled to the base, and wherein the semi-cylindrical body is rotatably coupled to the base.

5. The fishing rod carrier of claim 1, wherein the semi-cylindrical body surrounds a void for receiving a reel attached to the fishing rod.

6. The fishing rod carrier of claim 1, wherein the front holder portion further comprises at least one additional opening for receiving at least one additional tip end of at least one additional fishing rod.

7. The fishing rod carrier of claim 6, wherein the rear holder portion further comprises at least one additional semi-cylindrical body for receiving at least one additional handle end of the at least one additional fishing rod.

8. The fishing rod carrier of claim 1, wherein the front holder portion further comprises a strap configured to hold the fishing rod in the front holder portion.

9. The fishing rod carrier of claim 1, wherein the rear holder portion further comprises a strap configured to hold the fishing rod in the rear holder portion.

10. The fishing rod carrier of claim 1, wherein the front holder portion further comprises a rigid inner ring within the opening, the rigid inner ring comprising a split for insertion of the tip end of the fishing rod.

11. A fishing rod carrier comprising:
   a front holder portion comprising:
      a body surrounding an opening for receiving a tip end of a fishing rod, the body being made of foam or a gel type material; and
      means for coupling the front holder portion to one or more rails of a pickup truck bed;
   a rear holder portion comprising:
      a body for receiving a handle end of the fishing rod, at least a portion of the body being semi-cylindrical; and
      means for coupling the rear holder portion to one of the one or more rails,
   the rear holder portion and the front holder portion being located within the pickup truck bed below an uppermost surface of the pickup truck bed in the vertical direction, whereby a fishing rod carried by the front holder portion and the rear holder portion is located within the pickup truck bed below the uppermost surface of the pickup truck bed in the vertical direction.

12. The fishing rod carrier of claim 11 further comprising means for securing the fishing rod while maintenance is performed on one or more of a reel of the fishing rod and a line of the fishing rod.

* * * * *